United States Patent [19]
Bailey

[11] Patent Number: 5,447,142
[45] Date of Patent: Sep. 5, 1995

[54] METHOD AND APPARATUS FOR MAINTAINING RESERVOIR PRESSURE OF A CONSUMABLE, COMPRESSIBLE FUEL

[75] Inventor: John M. Bailey, Dunlap, Ill.

[73] Assignee: Caterpillar Inc., Peoria, Ill.

[21] Appl. No.: 350,351

[22] Filed: Dec. 6, 1994

[51] Int. Cl.[6] .......................................... F02M 21/04
[52] U.S. Cl. ................... 123/527; 123/27 GE; 138/30; 138/31; 220/530; 220/564
[58] Field of Search ............... 123/532, 533, 534, 527, 123/27 GE; 220/530, 564; 48/174–179; 138/30, 31; 417/307

[56] References Cited

U.S. PATENT DOCUMENTS

| | | | |
|---|---|---|---|
| 3,213,913 | 10/1965 | Petriello | 220/530 |
| 3,577,726 | 5/1971 | Wagner | 60/13 |
| 3,682,146 | 8/1972 | Mozokhin et al. | 123/32 |
| 4,205,638 | 6/1980 | Vlacancinch | 123/46 |
| 4,765,304 | 8/1988 | Brown | 123/532 |
| 4,865,002 | 9/1989 | Borst et al. | 123/532 |
| 4,878,519 | 11/1989 | Berding et al. | 138/31 |
| 4,944,277 | 7/1990 | Olson | 123/532 |
| 5,067,458 | 11/1991 | Bailey | 123/292 |
| 5,067,467 | 11/1991 | Hill et al. | 123/497 |
| 5,388,720 | 2/1995 | Murphy | 138/30 |

FOREIGN PATENT DOCUMENTS 3903891 8/1990 Germany .............................. 220/530
804500 11/1958 United Kingdom ................ 220/530

OTHER PUBLICATIONS

SAE Technical Paper 861169 A Neat Methanol Direct Injection Combustion System for Heavy Duty Applications, by Craig A, Kroeger, Sep. 8–11 '86.

Primary Examiner—Henry C. Yuen
Assistant Examiner—Erick Solis
Attorney, Agent, or Firm—Joseph W. Keen

[57] ABSTRACT

A method for maintaining the pressure of a compressible fuel resident in a reservoir above a predetermined minimum including withdrawing compressed air from an internal combustion engine's combustion chamber, further compressing that withdrawn air, transmitting that further compressed air to an expandable air compartment which, with a fuel compartment having an outlet, occupies the interior of a reservoir. Apparatus for maintaining the pressure of a compressible fuel above a predetermined minimum including a reservoir having an air compartment and a fuel compartment separated by a moveable barrier, an internal combustion engine having a combustion chamber, means for transmitting air from the combustion chamber to the air compartment, a compressor for compressing the transmitted air, and a valve for obstructing air transmission when the fuel compartment's pressure exceeds a predetermined maximum.

18 Claims, 2 Drawing Sheets

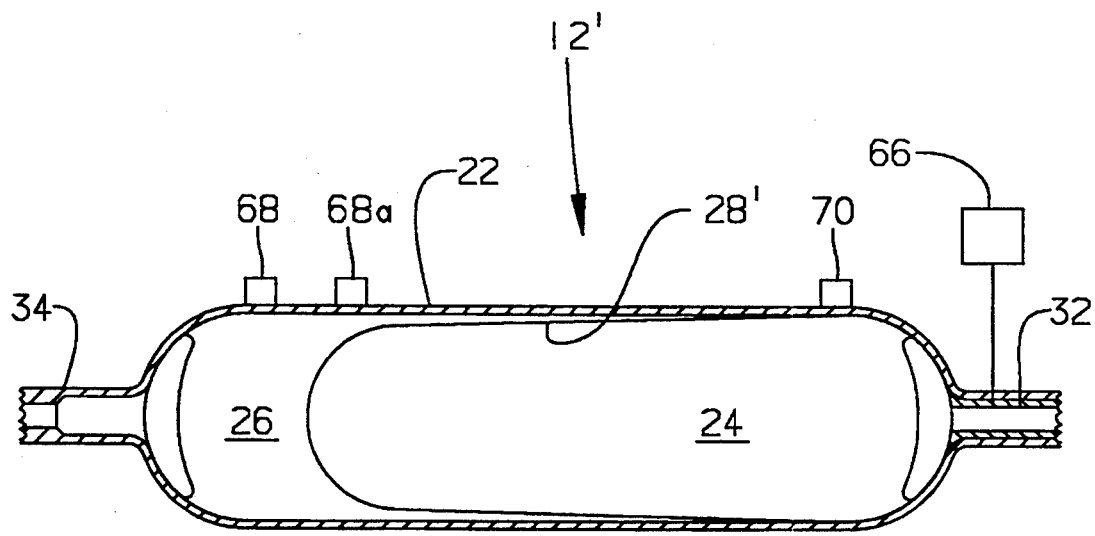
Fig_2_
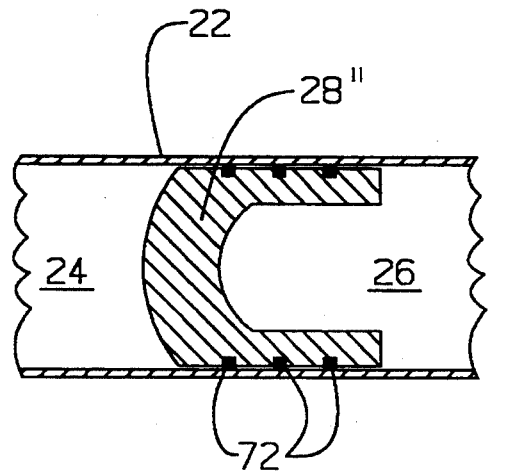
Fig_3_
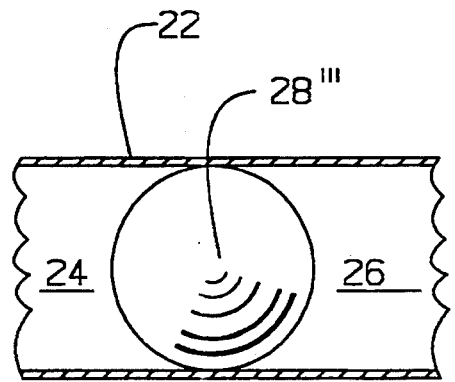
Fig_4_

METHOD AND APPARATUS FOR MAINTAINING RESERVOIR PRESSURE OF A CONSUMABLE, COMPRESSIBLE FUEL

TECHNICAL FIELD

This invention relates generally to compressible fuel storage and, more particularly, to maintaining a selected pressure of compressible fuel in a reservoir during depletion of such fuel from such reservoir.

BACKGROUND ART

Natural gas is a serious fuel candidate for mobile internal combustion engines because of its clean burning characteristics, its geographically wide availability, and its cost. Because natural gas, however, has a very low volumetric energy content at atmospheric pressure, special provisions must be employed to store a practical quantity of fuel energy on board mobile engine platforms. The two primary storage provisions are cryogenic liquefaction in thermally insulated tanks (known as liquid natural gas or LNG) or pressurization to about 3,000 psi in high pressure tanks (known as compressed natural gas). In addition, most mobile engine platforms have, heretofore, used conventional spark ignited otto cycle engines which are, as compared with diesel cycle engines, thermodynamically less efficient.

Mobile engine platforms require readily available sources of fuel to enable the user unfettered geographic movement. Liquid natural gas systems, in addition to adding substantial complexity to the mobile platform, lack a geographically widely-dispersed distribution system for refueling such mobile platforms. Accordingly, compressed natural gas systems for mobile platforms has found wide spread use because of a well developed distribution system for refueling and a relatively simple storage means for attachment to the mobile platforms.

Most compressed natural gas systems for mobile platforms have been employed in combination with spark ignited Otto cycle engines. Primary reasons for such use with Otto cycle engines rather than diesel cycle engines is that diesel cycle engines require injection into the utilizing engine combustion chamber at pressures in the 3,000 psi range due to the relatively high pressures realized within diesel cycle engines' combustion chambers as compared with Otto cycle engines' combustion chambers. Such higher pressure may, initially, be provided by the natural gas under pressure in its fuel storage reservoir as supplied by the refueling facilities. However, as the natural gas in the reservoir is consumed, the pressure of the natural gas remaining in such reservoir drops. Incorporating a high pressure compressor on a mobile platform suitable to pump the remaining natural gas to a suitably high pressure as its pressure (in the reservoir) drops to an unacceptably low level becomes a major consideration in terms of size and cost, especially in the case of a small mobile platform.

One attempt to provide the requisite injection pressure for natural gas in an internal combustion engine which is supplied with a variable pressure gaseous fuel supply is shown in U.S. Pat. No. 5,067,467 which issued Nov. 26, 1991. That invention used unit injectors having pressure intensifier apparatus driven by high pressure air supplied by the engine during its compression stroke. Such fuel system enables high pressure utilization of compressed natural gas stored in a high pressure reservoir but employs very complex structure and control apparatus. U.S. Pat. No. 4,765,304 issued Aug. 23, 1988 also employs fuel injectors driven by compressed air obtained from the combustion chambers of an associated internal combustion engine. U.S. Pat. No. 4,205,638 issued Jun. 3, 1980, illustrates the use of a free piston unit to use energy stored in a working medium to compress a fuel/air mixture injected into the combustion chamber of an engine. U.S. Pat. No. 3,682,146 issued Aug. 8, 1972, illustrates a system of fuel injection in a diesel cycle precombustion chamber in which a tank and jet pump are connected to the combustion chamber of an engine associated with the fuel system.

None of the aforementioned inventions have provided an altogether satisfactory solution to maintaining the pressure of natural gas or other compressible fuel housed within a reservoir at a pressure permitting its use in a diesel cycle engine when the natural gas is being withdrawn from the reservoir. The present invention is directed to overcoming one or more of the problems set forth above.

DISCLOSURE OF THE INVENTION

In one aspect of the present invention a method is disclosed for maintaining the pressure of a compressible fuel above a predetermined minimum during consumption of the fuel including withdrawing compressible fuel from a reservoir, withdrawing compressed air from a combustion chamber of an internal combustion engine in response to the fuel pressure in the reservoir falling below a selected minimum, compressing the air, transmitting the withdrawn air into the reservoir on one side of a movable barrier which segregates the air from the fuel. In another aspect of the present invention, apparatus for maintaining the pressure of a compressible fuel in a reservoir above a predetermined minimum during consumption of the fuel includes the reservoir having compressible fuel and compressible air therein separated by a movable barrier and having an inlet and an outlet, an internal combustion engine having a combustion chamber, a compressor for compressing air withdrawn from the combustion chamber and transmitting it to the reservoir's air compartment, and a valve for preventing air flow from the combustion chamber to the air compartment when the pressure of the compressible fuel is greater than a predetermined maximum.

BRIEF DESCRIPTION OF THE DRAWINGS

FIG. 2, FIG. 3, and FIG. 4 are schematic views of alternative embodiments of the reservoir illustrated in FIG. 1.

BEST MODE FOR CARRYING OUT THE INVENTION

Figure 1:
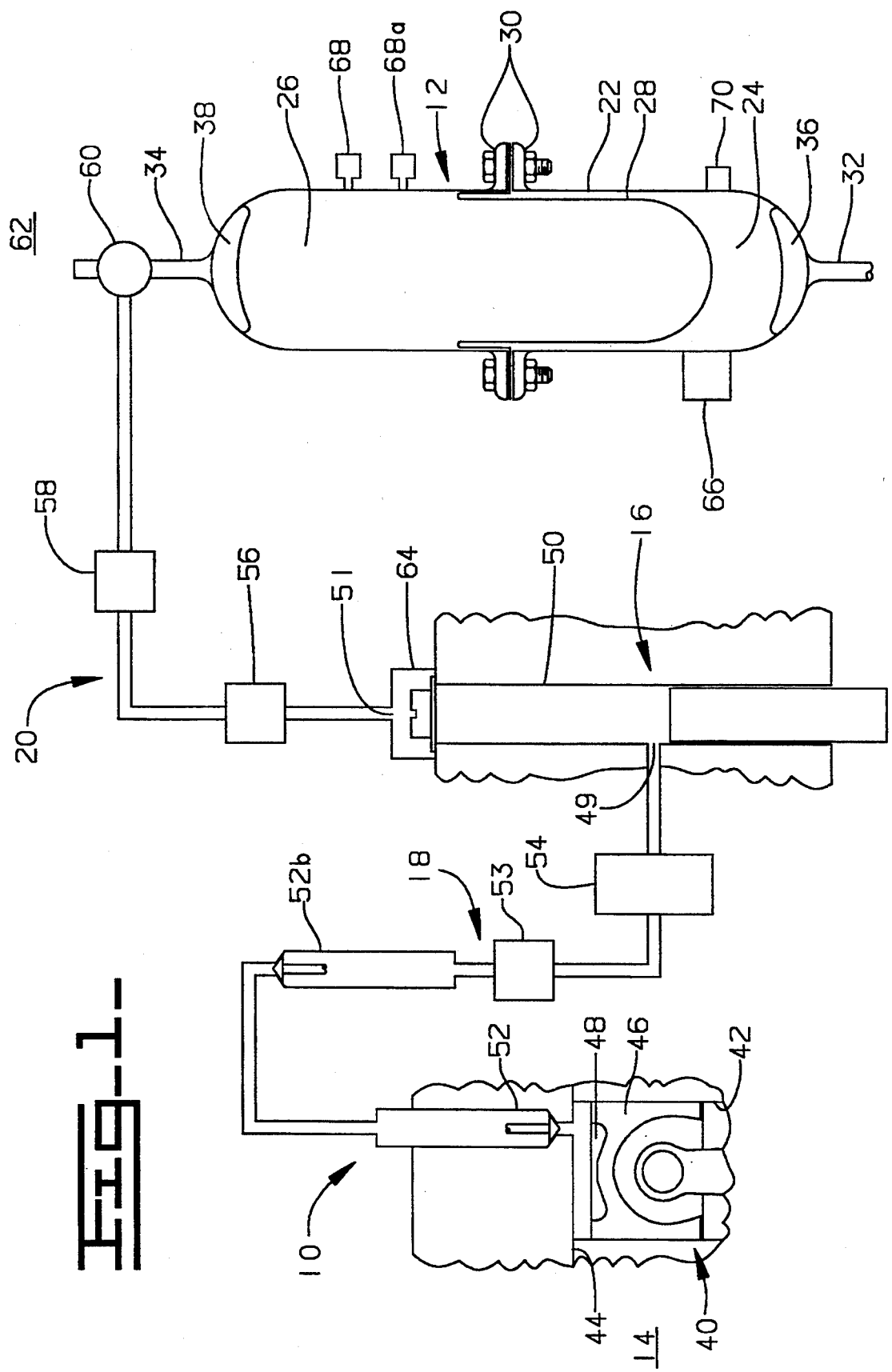
FIG. 1 is a schematic view of an apparatus for maintaining the pressure of a compressible fuel in a reservoir within a predetermined range.

Referring now to the drawings in detail, FIG. 1 illustrates apparatus 10 for maintaining the pressure of a compressible fuel (referred to hereafter as natural gas) above a predetermined minimum during consumption of that fuel. The apparatus 10 generally includes a reservoir 12, a diesel cycle internal combustion engine 14 only a portion of which is shown, a compressor 16, conduit 18 providing fluid communication between the engine 14 and the compressor 16, duct 20 which provides fluid communication between the compressor 16 and the reservoir 12.

The reservoir 12 includes an outer casing 22 capable of withstanding internal pressures of approximately 3,000 psi, a fuel compartment 24, an air compartment 26, and a movable barrier 28 which, in the illustrated embodiment of FIG. 1, constitutes an elastomeric bladder 28 joined to the casing 22 between a pair of flanges 30. An outlet 32 through the casing 22 permits fluid communication from the fuel compartment 24 to an external consumption apparatus (discussed later). An inlet 34 provides fluid communication from the air compartment 26 through the wall of casing 22. A porous metal or ceramic filter 36 is disposed in the fuel compartment across outlet 32 and is substantially undeformable as compared to typical paper, fiber mesh, or other gaseous filtering media. A similar metal/ceramic filter 38 is, likewise, supported in the air compartment 26 across the inlet 34.

The diesel cycle internal combustion engine 14 includes at least one cylinder 40 which is defined by a cylinder wall 42. As is well known in the art, the cylinder wall 42, a cylinder head 44 mounted at one end of the cylinder wall 42, and a piston 46 which is reciprocatably mounted within the cylinder 40 in sealing engagement with the cylinder wall 42 cooperate to define a combustion chamber 48 of variable-size, depending upon the reciprocatable position of the piston 46. As is also well known in the art, air is admitted at an appropriate time during the engine's thermodynamic cycle into the combustion chamber 48, fuel is introduced into the combustion chamber 48 at an appropriate time during the compression and/or expansion stroke and ignited at another appropriate time, and the exhaust gasses and other products of combustion are expelled from the combustion chamber 48 at yet another appropriate time.

The compressor 16 includes an intake port 49, a compression housing 50, and an exhaust port 51 through which air is respectively drawn in, compressed, and expelled in a compressed state. The compressor 16 may be of any suitable type capable of compressing air from about 400 psi to about 3000 psi. Ideally, compressor 16 has a variable output pressure up to and including 3000 psi or more, depending upon the design storage pressure of the reservoir and required gas fuel injection pressure.

Conduit 18 extends through head 44 to provide fluid communication from the combustion chamber 48 to the compressor intake port 49. A valve 52 comprises means for obstructing air flow from the combustion chamber 48 to the compressor intake port 49 except during the compression stroke of the piston 46 when fuel is absent from the combustion chamber 48. Preferably, air flowing through the conduit 18 will sequentially pass through a cooler 53 and a filter 54 before entering intake port 49 of the compressor 16. Air traveling through conduit 20 from exhaust port 51 of the compressor 16 to the inlet 34 of reservoir 12, preferably, sequentially passes through a filter 56 and a cooler 58. A valve 60 selectively provides fluid communication between conduit 20 and inlet 34 or between inlet 34 and atmosphere or other low pressure source 62.

A check valve 64 disposed at the exhaust port 51 prevents air from flowing through the compressor from the exhaust port 51 to the intake port 49. A pressure measuring device 66 measures the pressure of the fuel in fuel compartment 24 and transmits a signal indicative of same. A microprocessor or other controlling device (not shown), in response to receiving a signal from device 66 indicating that the pressure in compartment 24 is less than about 3000 psi, will permit valve 52 to open if (1) the engine is on the compression stroke, and if (2) there is no fuel resident in the combustion chamber 48. Although not shown, a microprocessor capable of receiving input signals indicative of (1) and (2) and generating an opening signal for opening valve 52 is well known in the art. To prevent loss of air from duct 18 if the cylinder pressure is lower than the pressure in duct 18 when valve 52 opens, a check valve 52B is used in series with valve 52 or incorporated as part of it. When the pressure measured by device 66 exceeds a predetermined maximum, approximately 3,200 psi, such microprocessor thereafter prevents air flow from the combustion chamber 48 to the air compartment 26 preferably by preventing opening of the valve 52.

A fuel detector 68 is employed to detect any fuel which may intrude into the air compartment 26 due to a leak in the bladder 28 or other malfunction of the system. If fuel is detected by detector 68, suitable safety related actions may be initiated such as closing of the valve 52, venting of the air compartment 26 to atmosphere 62, or shutdown of the engine 14. A pressure relief valve 68A is employed to prevent excess pressurization of the air compartment due to malfunction of the system or as a part of the pressure regulation system if no control is exerted over valve 52 or compressor 16. A refueling valve/inlet 70 permits selective fluid communication to the fuel compartment 24 when refueling of the reservoir 12 is desired.

While the preferred arrangement uses an electronically actuated valve 52 to extract pressurized air from the engine cylinder, an alternate arrangement, valve 52 could constitute a simple check valve to perform this function. The check valve 52 would permit air flow from the cylinder 40 to occur whenever the pressure in the engine cylinder is greater than the pressure existing in duct 18, regardless of whether fuel injection and/or combustion has occurred. Control of reservoir pressure would be effected by suitable control of compressor 16 such as by inlet throttling or other control systems known in the art. This alternate arrangement would be viable for engines in which the duct from the cylinder 40 to the inlet check valve 52 could be located such that no significant amount of unburned compressible fuel would enter duct 18 during any of the possible operating conditions of the engine to prevent an explosive mixture from entering the air compartment 26. Products of combustion would probably be inducted into duct 18 but these would be cooled and filtered and would present no problems when subsequently directed into the air compartment 26.

While only a single cylinder 40 of engine 14 has been illustrated as being a part of the apparatus 10, it is to be understood that multiple cylinders of the same or additional engines may, likewise, have combustion chambers manifolded to conduit 18 with the same utility as that illustrated.

FIG. 2 illustrates an alternate embodiment reservoir 12' which includes a casing 22 having an inlet 34 and an outlet 32 but with an alternate embodiment barrier 28' preferably comprising an elastomeric bladder connected to the casing 22 at one end thereof adjacent outlet 32. Of course, it is within the purview of the present invention to attach the bladder 28 to the cylinder wall 22 at a different location than illustrated in FIGS. 1 or 2.

FIG. 3 shows a third embodiment 28" of the movable barrier within the reservoir and comprises a movable piston 28" which is displacable in the left and right directions as viewed from the vantage point of FIG. 3 in closely sealing relationship with the interior of casing 22. Piston 28" has, by example, three sealing members 72 which engage both the piston 28" and the interior surface of casing 22 so as to effectively segregate the gas compartment 24 from the air compartment 26.

FIG. 4 illustrates yet a fourth embodiment 28''' of a movable barrier which comprises a rollable sphere 28''' in close, sealing engagement with the interior surface of reservoir casing 22 which effectively segregates the air compartment 26 from the fuel compartment 24.

INDUSTRIAL APPLICABILITY

By using the pressure maintaining apparatus 10 and the method described for maintaining the pressure of a compressible fuel within a predetermined range, a practical solution has been realized for using compressible fuel in a diesel cycle internal combustion engine (whether or not mounted on a mobile platform). Exemplary operation of such apparatus 10 will now be described in association with the FIGS.

The most instructive operational description of apparatus 10 is provided by tracing the state of its components and the state of the space within those components from the time the reservoir 12 has been refueled with a compressible fuel until the time refueling of reservoir 12 is again required. When refueling is required, air pressure in the air compartment 26 is at a level of greater than 3000 psi (approximately 3200 psi) and bladder 28 has moved such that the air compartment 26 occupies nearly the entire internal volume of the reservoir 12. Valve 60 is moved (whether by hand or by force assisted means) to its second, venting position wherein the air compartment 26 is vented to atmosphere 62 permitting bladder 28 to move toward the inlet 34 under pressure of the compressible fuel remaining within the fuel compartment 24. The extent of the bladder retraction is dependent upon the pressure and quantity of the fuel remaining in fuel compartment 24, the expandability of the bladder 28 and the extent to which pressure in the air compartment 26 is bled down. In any case, the substantially undeformable filter 38 prevents the bladder 28 from extruding into the inlet 34 during the venting process. High pressure compressible fuel is then pumped into the reservoir through the refueling valve/inlet 70 causing the bladder 28, if not already retracted into engagement with the filter 38, to so retract and engage. When the pressure within fuel compartment 24 reaches the desired pressure level, refueling valve/inlet 70 is closed and inlet valve 60 is moved to its first position where duct 20 and inlet 34 are again fluidly connected. The filter 38 prevents the bladder 28 from being extruded into the outlet 32 of the reservoir if the gaseous fuel should be completely depleted in the same manner as described for filter media 38 during refueling.

When the apparatus utilizing the compressible fuel (most likely an internal combustion engine which may or may not be engine 14) is restarted, fuel flows from the fuel compartment 24 through outlet 32 to the utilizing apparatus. Hereafter, for purposes of this discussion, engine 14 will be considered the utilizing apparatus of the fuel. During the course of its operation, piston 46 goes downwardly as viewed in FIG. 1 for its intake stroke permitting air to be drawn into the expanding combustion chamber 48 through one or more air inlet valves (not shown) into the combustion chamber 48. Such air inlet valves are then closed and piston 46 begins moving upwardly in its compression stroke. At an appropriate time (depending on a number of engine performance factors), the compressible fuel will be injected into the combustion chamber 48 and ignited by any one of a variety of ignition assist devices (not shown) causing the piston 46 to move downwardly through its power stroke. After piston 46 reaches the bottom of its power stroke, it will begin moving upwardly and one or more exhaust valves will be opened permitting the upwardly moving piston 46 to expel the combustion products from the combustion chamber 48 to the atmosphere. Thereafter, the piston 46 will repeat the movement described above. While a four stroke diesel cycle engine has been described, it is to be understood that other types of diesel cycle engines can be employed within the purview of the present invention.

During operation of the utilizing engine (14 in this case), fuel from within the fuel compartment 24 will be slowly consumed causing the pressure in fuel compartment 24 to decrease. When the pressure measuring device 66 signals that the pressure within fuel compartment 24 has fallen below a predetermined level (approximately 2900 psi), the microprocessor or other control device will actuate valve 52 to the open position during the engine's compression stroke so as to permit air from the combustion chamber 48 to be forced into conduit 18 at pressures in the range of approximately 500 to 1000 psi depending upon the utilizing engine's load. Valve 52 will be closed prior to the earlier of: fuel injection within the combustion chamber 48; and the piston 46 being near the top of its compression stroke.

Air forced into conduit 18 will sequentially pass through cooler 53 and filter 54 prior to entering intake 49 of the compressor 16. Once in compressor housing 50, the air will be compressed to approximately 3200 psi and forced through check valve 64 and out exhaust 50 into duct 20. Check valve 64, by only opening for air flow from tile compressor 16 into duct 20, will prevent flow of high pressure air from air compartment 26 into the compressor 16 when compressor 16 is not operating or when valve 52 is not conducting air into conduit 18. Air discharged into conduit 20 will sequentially pass through the filter 56 to remove any oil or other impurities picked up from the compressor and then through cooler 58, valve 60, inlet 34, filter media 38 and into air compartment 26. By providing compressed air into the air compartment 26 in accordance with the previously mentioned process, the bladder 28 will expand toward the fuel outlet 32 causing the pressure of the fuel remaining in fuel compartment 24 to increase to a predetermined level (approximately 3000 psi) at which time pressure measuring device 66 will send a signal to the microprocessor which will thereafter regulate valve 52 and/or compressor 16 to discontinue the compressed air flow into air compartment 26. In this manner the pressure of the fuel in fuel compartment 24 is maintained within a narrow band of acceptable pressures.

While the operation of apparatus 10 has been described for use of the reservoir 12 which employs the bladder 28, it is to be understood that the barrier means residing in the reservoir may, with equal facility, assume the forms shown in FIGS. 2–4. The bladder 28' of FIG. 2 will expand and contract in the same manner as the bladder 28, the piston 28''' of FIG. 3 will move gradually to the left (from the vantage point of FIG. 3) during consumption of the fuel, and the ball of FIG. 4 will roll toward the left (from the vantage point of FIG.

4) during consumption of the fuel. All such barriers will, however, maintain a separated relationship between the fuel and air.

It should now be apparent that apparatus has been provided for maintaining the pressure of a compressible fuel within an acceptable range during withdrawal of fuel from the reservoir 12. Such withdrawn fuel may be used within the diesel cycle engine 14 which is, in turn, used to maintain the pressure of the fuel in the reservoir 12 by providing a first stage of compression which is followed by a second stage of compression by an auxiliary compressor 16. Of course, the fuel withdrawn from the reservoir 12 may also be used for other purposes.

I claim:

1. A method for maintaining the pressure of a compressible fuel above a predetermined minimum during consumption of the fuel comprising:
   withdrawing compressible fuel from a reservoir;
   withdrawing air from a combustion chamber of an internal combustion engine in response to the fuel pressure in the reservoir falling below a predetermined minimum;
   compressing the withdrawn air to a pressure greater than said predetermined minimum; and
   transmitting the compressed air into the reservoir on one side of a moveable barrier which segregates the air from the fuel.

2. The method of claim 1 wherein said air withdrawing continues until the fuel pressure in the reservoir reaches a predetermined maximum.

3. The method of claim 1 further comprising:
   obstructing air flow from the reservoir to the combustion chamber.

4. The method of claim 1 further comprising:
   selectively venting the reservoir's air chamber to a lower pressure.

5. The method of claim 1 wherein said air transmission includes forcing said air through a relatively undeformable filter residing in the reservoir.

6. The method of claim 1 wherein said fuel withdrawal includes extracting said fuel through a relatively undeformable filter residing in the reservoir.

7. The method of claim 1, further comprising:
   injecting the withdrawn fuel into the combustion chamber.

8. Apparatus for maintaining the pressure of a fixed mass of compressible fuel above a predetermined minimum during consumption of the fuel comprising:
   a reservoir having compressible fuel and compressed air therein, said reservoir having a fuel compartment and an air compartment for segregating same, said reservoir having an inlet and an outlet respectively associated with the air compartment and the fuel compartment;
   an internal combustion engine having a combustion chamber;
   a compressor having an intake and an exhaust port, said intake port being in fluid communication with said combustion chamber, said exhaust port being in fluid communication with said reservoir inlet; and
   control means for obstructing air flow from the combustion chamber to the inlet when the pressure of the compressible fuel in said reservoir is greater than a predetermined maximum and for providing air flow from the combustion chamber to the inlet when the pressure of the compressible fuel in said reservoir is less than the predetermined minimum.

9. The apparatus of claim 8, said reservoir further comprising:
   a moveable barrier having the fuel compartment on one side and the air compartment on the other side.

10. The apparatus of claim 9, said moveable barrier comprising one of:
    a bladder; a sliding sealable piston; and a rolling sealable ball.

11. The apparatus of claim 8, further comprising:
    a valve for preventing air flow from said air compartment to said combustion chamber.

12. The apparatus of claim 8 further comprising:
    a valve for selectively providing fluid communication between said air compartment and a lower pressure source.

13. The apparatus of claim 8 wherein said reservoir has an undeformable filter disposed in said air compartment adjacent said inlet.

14. The apparatus of claim 8 wherein said reservoir has an undeformable filter disposed in said fuel compartment adjacent said outlet.

15. The apparatus of claim 8 wherein said outlet is fluidly connected to the combustion chamber.

16. The apparatus of claim 8, said control means further comprising:
    means for providing said air flow only during the combustion chamber's compression cycle.

17. The apparatus of claim 8, said control means further comprising:
    means for obstructing air flow from the combustion chamber to the inlet when the pressure of the compressible fuel in said reservoir is greater than a predetermined maximum.

18. The apparatus of claim 8, said control means further comprising:
    means for venting air from the air compartment when the pressure therein is greater than a predetermined maximum.

* * * * *